United States Patent [19]

McCanse et al.

[11] 4,386,661
[45] Jun. 7, 1983

[54] REAR MOUNTED ROTARY TILLER

[75] Inventors: James E. McCanse; Jugraj S. Dhaliwal, both of Oregon, Ill.

[73] Assignee: Hesston Corporation, Hesston, Kans.

[21] Appl. No.: 299,785

[22] Filed: Sep. 8, 1981

[51] Int. Cl.³ .............. A01B 33/02; A01B 33/14; A01B 59/042; A01B 71/02

[52] U.S. Cl. ............. 172/112; 172/78; 172/79; 172/82; 172/103; 172/123; 172/125

[58] Field of Search ............. 172/112, 119–123, 172/125, 42, 43, 97, 98, 103, 548, 549, 76–79, 47, 82

[56] References Cited

U.S. PATENT DOCUMENTS

| 1,662,088 | 3/1928 | Von Raussendorff | 172/112 X |
| 2,279,652 | 4/1942 | Beard | 172/121 X |
| 2,491,892 | 12/1949 | Claus | 172/549 |
| 2,539,053 | 1/1951 | Blackledge | 172/549 |
| 2,651,246 | 9/1953 | Peters et al. | 172/78 X |
| 2,657,620 | 11/1953 | Meeks | 172/548 X |
| 3,133,598 | 5/1964 | Caldwell | 172/120 X |
| 3,233,686 | 2/1966 | Steadman | 172/123 X |

FOREIGN PATENT DOCUMENTS

| 710568 | 6/1965 | Canada | 172/120 |
| 1024279 | 2/1958 | Fed. Rep. of Germany | 172/78 |
| 1272612 | 7/1968 | Fed. Rep. of Germany | 172/123 |
| 1279993 | 10/1968 | Fed. Rep. of Germany | 172/112 |
| 2658244 | 11/1977 | Fed. Rep. of Germany | 172/47 |
| 584445 | 10/1958 | Italy | 172/98 |
| 710942 | 7/1966 | Italy | 172/123 |
| 7903792 | 11/1980 | Netherlands | 172/98 |
| 198630 | 9/1938 | Switzerland | 172/123 |
| 711982 | 7/1954 | United Kingdom | 172/78 |

Primary Examiner—Paul E. Shapiro
Attorney, Agent, or Firm—Schmidt, Johnson, Hovey & Williams

[57] ABSTRACT

The low-profile, lightweight tiller of compact, uncluttered design is adapted to be rigidly mounted upon the rear, powered lifting links of a garden tractor so as to be raised and lowered by the latter between transport and ground-working positions. Driving power for the transverse rotor of the tiller is obtained by a direct drive connection with the power takeoff shaft of the tractor. A right angle gearbox located inside the open bottom housing for the rotor is supported by the rotor shaft itself and has an upwardly and forwardly directed input shaft that connects directly with a telescoping, universal joint drive line connection with the power takeoff shaft. A special telescopic construction of the rotor allows the same to be adjustably shifted through the gearbox in order that the rotor may be selectively laterally offset with respect to the tractor wheels, and the rotor housing is sectionalized such that opposite end sections thereof may be detached from one end of the central section and added onto the opposite end section to properly house the rotor when the latter is likewise offset.

9 Claims, 13 Drawing Figures

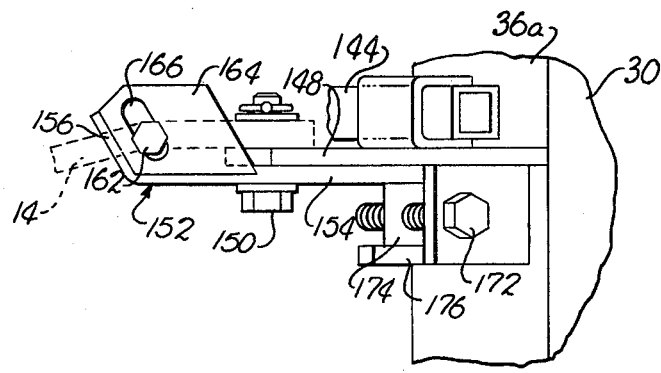
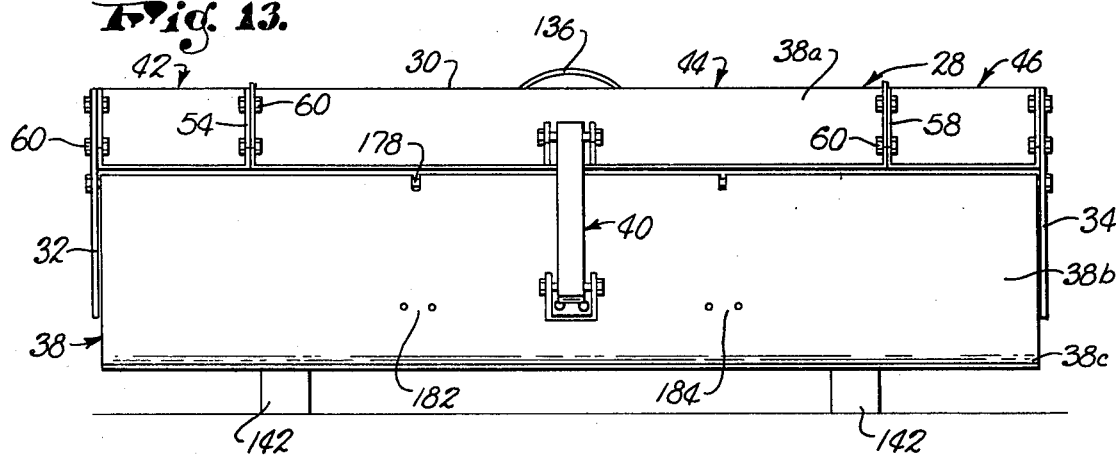
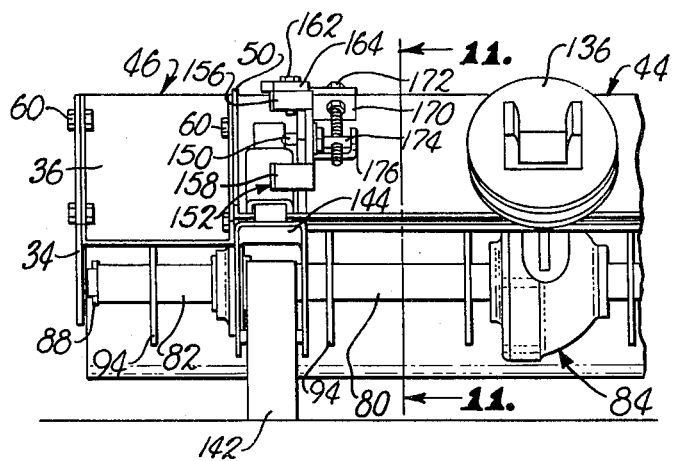

REAR MOUNTED ROTARY TILLER

TECHNICAL FIELD

This invention relates to the field of relatively light duty tractor-mounted tillers of the kind typically utilized in connection with low horsepower tractors for garden cultivation, preparing a proper seedbed for new lawns, landscaping, and mulching and tilling for weed control purposes such as between the rows of grapes, blueberries and other fruit-bearing plants.

BACKGROUND ART

Presently available tillers of the class herein involved are typically burdened with excessive and costly structures in the form of projecting gearboxes, chain drives, pulleys, belts, frames, tubes, and the like, all of which provide a cluttered, complicated design that increases material costs, provides additional areas for mechanical failures, adds weight, and increases the cost of maintenance and repair. Furthermore, such tillers typically are either designed for inline operation directly behind the tractor in symmetrical relationship with the center line thereof, or offset operation with the tiller situated behind only one of the tractor wheels and projecting laterally outward therefrom. In many instances, due to the larger size of the tractor utilized, the rear wheels are wider than the tiller itself such that if the tiller is situated directly behind the tractor, the wheels will leave tracks along opposite margins of the tilled area. This is unsuitable in landscaping and lawn-preparing operations where all of the soil must be cultivated and smoothed. Consequently, in such situations, separate, offset tillers have been utilized in order that the inboard wheel tracks will always be removed by the trailing cultivator on each pass of the tractor and only on the last pass can there be an outboard track left to be smoothed and eradicated.

SUMMARY OF THE PRESENT INVENTION

Accordingly, one important object of the present invention is to provide a rear mounted tiller of simplified, compact, uncluttered design, providing fewer opportunities for mechanical failures and malfunctions without sacrificing fast, efficient, high quality performance. Additionally, it is an important objective to provide a design of the foregoing type which can be readily adjusted for either inline or offset operation as the need may arise whereby to provide a way of avoiding the cost-ineffective practice of having two separate tillers of inline and offset capabilities respectively.

In connection with the foregoing, the tiller of the present invention has substantially all of the driving and working components thereof located within and below the protective housing of the transverse rotor, including a right angle gearbox which receives driving power from the fore-and-aft extending drive line from the tractor and directs it transversely of the drive line to the rotor assembly. Basically, only the mounts for connecting the tiller to the lifting links of the tractor and an upwardly and forwardly extending input shaft for the tiller protrude beyond the upper profile of the housing, and the only component between the power takeoff shaft of the tractor and the input shaft to the gearbox of the tiller is a telescoping, U-joint connector to provide a straightin, direct drive line arrangement for the tiller. The gearbox is floatingly supported beneath the housing by the rotor shaft itself which is in turn bearing-supported by wall portions of the housing. A telescopic construction for the rotor enables the same to be slid through the gearbox to the extent necessary to offset the rotor relative to the input shaft thereof, and detachable end sections of the housing can likewise be repositioned to lengthen the housing in one lateral direction or the other relative to a symmetrical position with the drive line for properly housing the rotor even in its offset condition. As a result of the manner in which the tiller is rigidly mounted onto the lifting links of the tractor to effectively become rigid extensions thereof, cumbersome, upright A-frames and the like used in three-point hitch connection arrangements are entirely avoided.

BRIEF DESCRIPTION OF THE DRAWINGS

FIG. 10 is a fragmentary, front elevational view of the right half of the tiller;

FIG. 12 is a fragmentary, top plan view thereof and;

FIG. 13 is a rear elevational view of the tiller.

DETAILED DESCRIPTION

Figure 1:
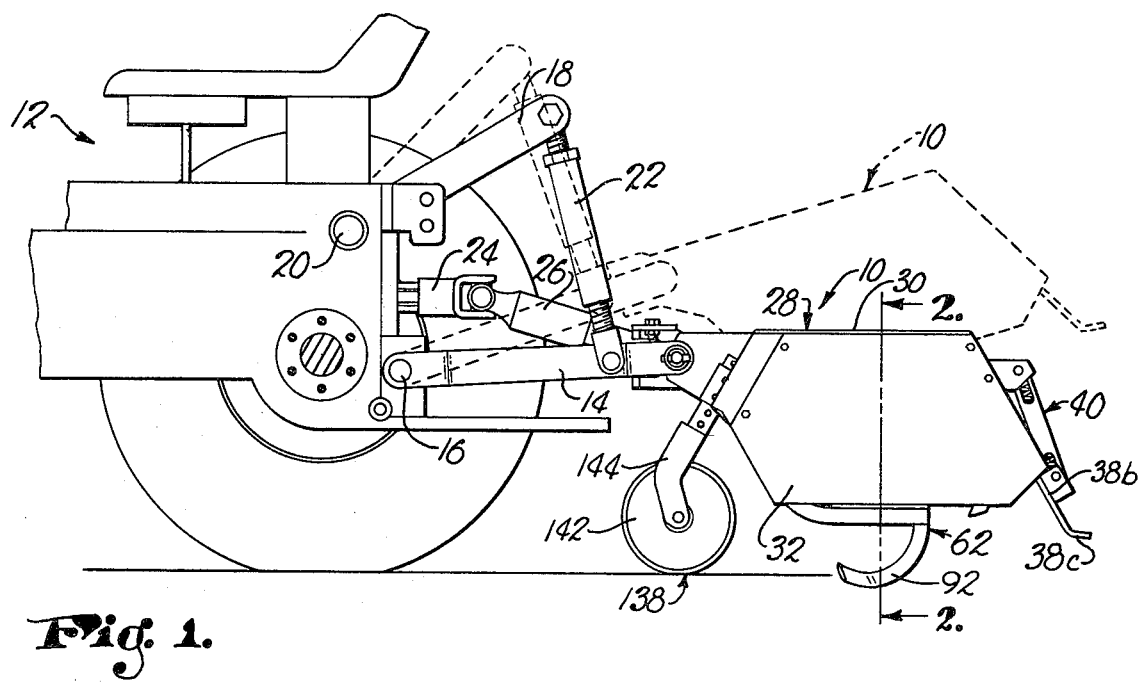
FIG. 1 is a fragmentary elevational view of a tiller constructed in accordance with the principles of the present invention attached to the rear lifting links of a pull tractor, the left wheel of the tractor being removed for clarity and the transport position of the tiller and lifting components of the tractor being shown in phantom lines.

The tiller 10 of the present invention is adapted for use with a generally light duty tractor such as that fragmentarily shown in FIG. 1 and indicated by the reference numeral 12. Such tractor 12 is typically provided with a pair of laterally spaced lifting links 14 (only one being shown) pivoted to the tractor chassis at point 16 for vertical swinging movement between raised and lowered positions. Hydraulically-powered, rearwardly extending arms 18 (only one being shown) located above the links 14 and vertically swingable about pivots 20 are coupled with the lift links 14 via connectors 22 so as to effect the abovementioned raising and lowering of links 14 and any structures coupled therewith. A "power takeoff" or output shaft 24 projects rearwardly from the tractor chassis above and midway between the lifting links 14 for supplying driving power to mechanism coupled therewith. In accordance with the present invention, a conventional telescopic, universal joint drive member 26 is coupled with the rear end of output shaft 24 and projects rearwardly therefrom for operable coupling with the tiller 10.

The tiller 10 includes an elongated, open bottom housing denoted generally by the numeral 28 that is disposed with its longitudinal axis in transverse relationship to the path of travel of the tractor 12. The housing 28 broadly includes a broad, flat, top wall portion 30, a pair of opposite, vertical endwall portions 32 and 34 respectively, a downwardly and forwardly inclined front wall portion 36 of double wall construction having a forwardmost part 36a and a rearwardmost part 36b as shown, for example, in FIG. 7, and a downwardly and rearwardly inclined rear wall portion 38. The rear wall portion 38 itself includes an upper part 38a and a lower part 38b hinged to upper part 38a and spring biased downwardly to the position illustrated by assembly 40 in order to provide a soilsmoothing effect as the rearwardly outturned tip 38c of part 38b engages the cultivated soil during operation.

Figure 2:
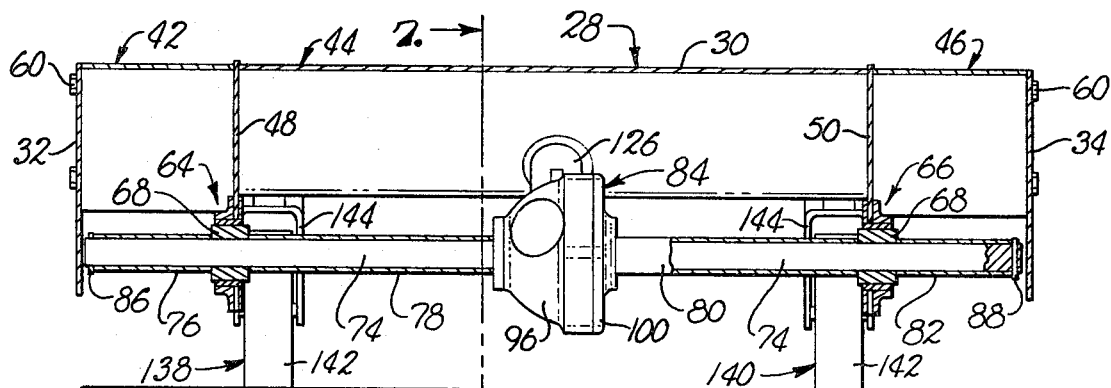
FIG. 2 is an enlarged, vertical cross-sectional view of the tiller taken longitudinally thereof and transversely of the path of travel of the tractor looking forwardly with respect to the direction of travel of the tiller.
Figure 3:
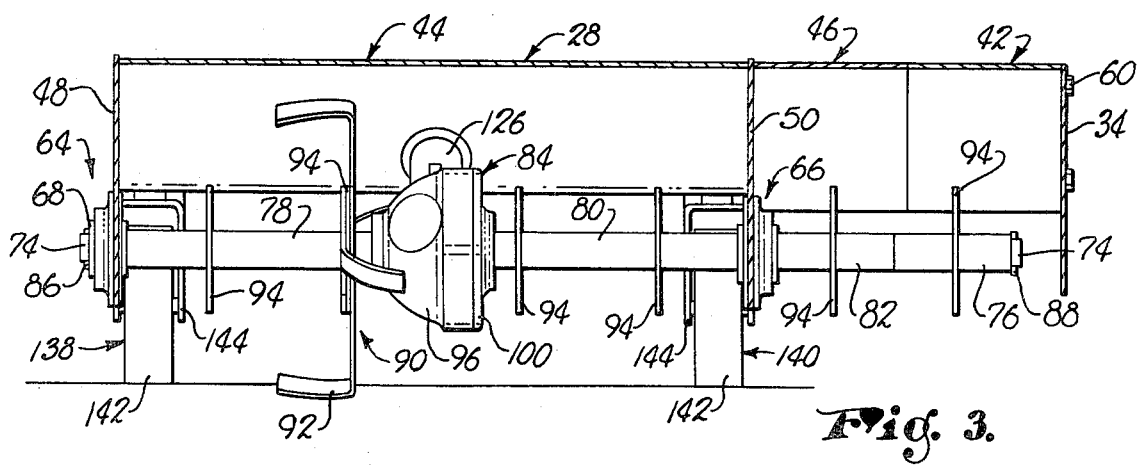
FIG. 3 is a cross-sectional view of the tiller similar to FIG. 2 but showing the latter adjusted for rightwardly laterally offset operation.
Figure 4:
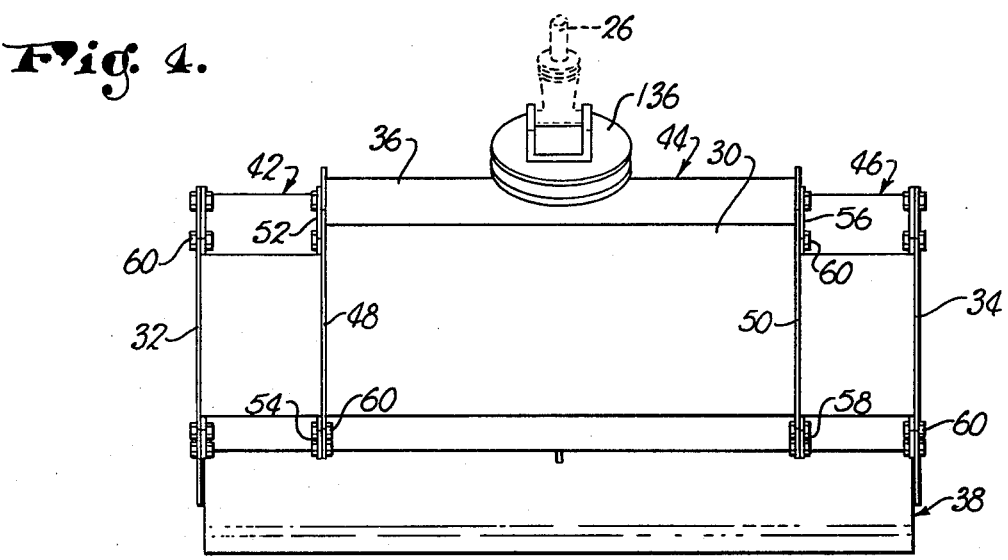
FIG. 4 is a schematic top plan view of the tiller illustrating same in condition for inline operation directly behind and in schematical relationship to the towing tractor.
Figure 5:
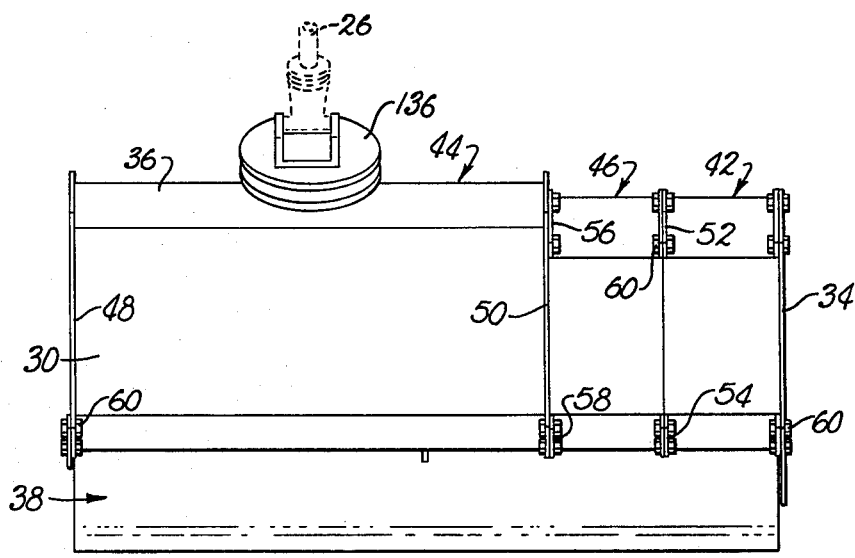
FIG. 5 is a similar top plan view of the tiller adjusted for rightwardly laterally offset operation.
Figure 6:
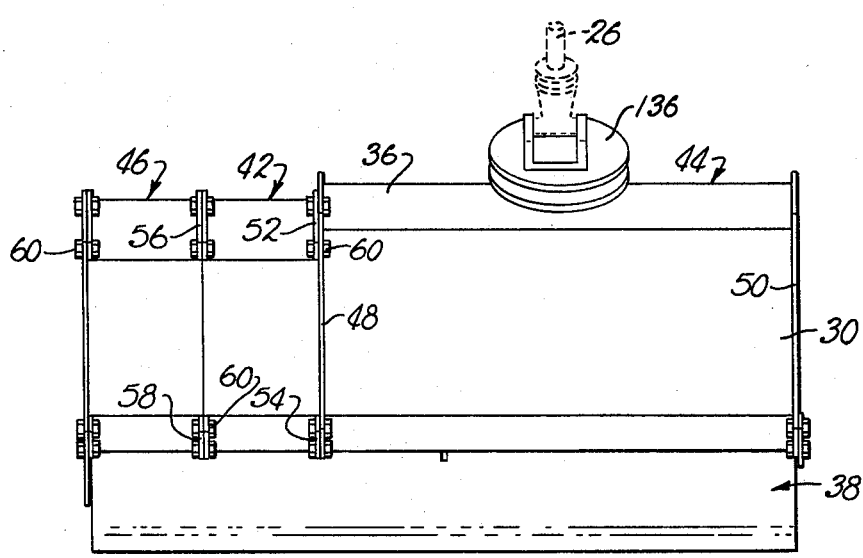
FIG. 6 is a similar view of the tiller adjusted for leftwardly laterally offset operation.

The housing 28 is actually subdivided into a set of three different sections 42, 44 and 46 which cooperate to jointly present the various wall portions above described. As illustrated schematically in FIGS. 4, 5 and 6, the three housing sections 42, 44 and 46 are detachably connected to one another so as to permit removal and repositioning thereof for inline operation of the tiller as illustrated in FIG. 4, rightwardly offset operation as illustrated in FIG. 5, or leftwardly offset operation as illustrated in FIG. 6. To this end (as shown in FIGS. 2 and 3), the central housing section 44 includes its own pair of upright, longitudinally spaced apart endwall portions 48 and 50 spanning the distance between the top, front and rear wall portions 30, 36 and 38 and projecting slightly above the upper periphery of the housing 28 in the nature of flanges. The left housing section 42 has upstanding flanges 52 and 54 at the lateral margins of the front and rear portions thereof respectively, while the right section 46 is likewise provided with front and rear sets of mounting flanges 56 and 58 along its front and rear portions respectively. Suitable removable fasteners 60 are utilized to connect the housing sections 42 and 46 to the central section 44 or to each other as the case may be via the various flanges 52, 54, 56, 58 and sidewall portions 48,50 of central section 44, depending upon which of the arrangements illustrated by FIGS. 4, 5 and 6 is selected for use. Outermost end wall portions 32 and 34 of the housing 28 may likewise be detachably mounted onto the sections 42 and 46 as the case may be by fasteners 60.

The housing 28 serves as both a shielding cover and as a means of structurally supporting a transverse, tilling rotor 62. Adjacent the lower ends of the interior endwall portions 48 and 50, a pair of respective bearings 64 and 66 are located to journal the rotor 62 for rotation about an axis parallel to the longitudinal axis of the housing 28 and transverse to the normal path of travel of the tiller 10 and the tractor 12. Each of the interior endwall portions 48 and 50 is suitably apertured to accept the bearings 64 and 66 respectively, and each of the latter includes a radially innermost, cylindrical component 68 having a cross-sectionally rectangular bore 70 therethrough. The components 68 are rotatably supported by stationary, radially outwardly disposed components 72 of bearings 64,66. Inner components 68 receive a cross-sectionally rectangular, innermost shaft 74 of rotor 62 in mating relationship therewith such that components 68 and shaft 74 rotate together about the longitudinal axis of shaft 74. The shaft 74 is, however, axially slidable within the bearing components 68.

Figure 7:
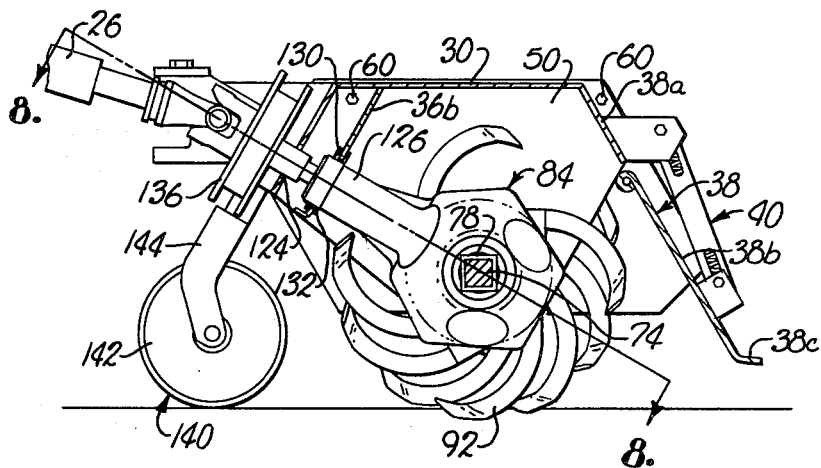
FIG. 7 is a vertical transverse cross-sectional view through the tiller taken substantially along line 7—7 of FIG. 2.

The rotor 62 further includes a series of tubular, cross-sectionally rectangular outer shaft segments 76, 78, 80 and 82 respectively which have mating configurations with respect to the inner shaft 74 so as to be rotatable therewith, yet which are axially slidable relative thereto. As illustrated in FIG. 2, the left outboard shaft segment 76 extends between the left outer end of the shaft 74 and the component 68 of bearing 64, the shaft segment 78 extends between the bearing component 68 and a right angle gearbox 84, the segment 80 extends between the gearbox 84 and the component 68 of bearing 66, and the shaft segment 82 extends between the component 68 and the right outer end of the inner shaft 74. Removable, transverse pins 86 and 88 at opposite ends of the inner shaft 74 releasably hold the outer segments 76 and 82 against axial sliding and likewise hold the inner shaft 74 against axial sliding relative to the gearbox 84 in view of the fact that the pins 86,88 bear against the outer segments 76,82 which in turn bear against the bearing components 68 that are immovably mounted onto the wall portions 48,50 of the housing 28. As illustrated in FIG. 3 and as also shown in FIGS. 1 and 7, the rotor 62 additionally includes a series of groundworking blade units 90, each of which includes a set of four, generally radially outwardly projecting blades 92 suitably inturned or outturned at their terminal ends for aggressively working the soil engaged thereby. The blades 92 of each unit 90 are bolted or otherwise suitably attached to a generally rectangular plate 94 which is in turn rigidly affixed to a corresponding outer shaft segment 76, 78, 80 or 82. Each of the shaft segments 78 and 80 has a pair of the blade units 90 secured thereto, while the shaft segments 76 and 82 are each provided with a single one of the blade units 90. The rotor 62 receives driving power from the tractor 12 via the right angle gearbox 84 which changes the direction of driving power from a fore-and-aft direction to a transverse, horizontal direction. The rotor 62 provides the support for gearbox 84 with the latter being located substantially midway between the wall portions 48,50 of the housing 28.

Figures 8, 9:
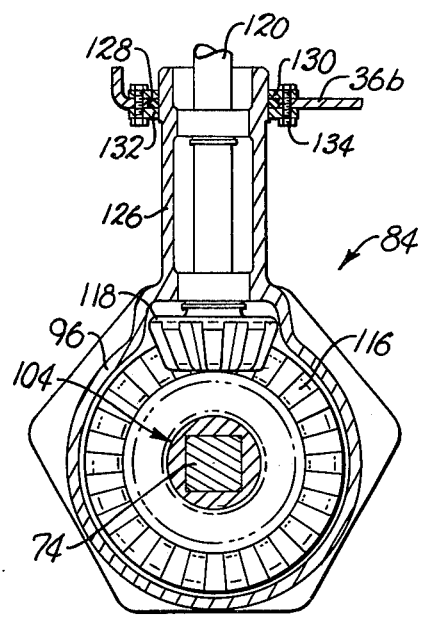
FIG. 8 is an enlarged, fragmentary cross-sectional view through the gearbox and rotor of the tiller taken substantially along line 8—8 of FIG. 7.
FIG. 9 is a fragmentary cross-sectional view of the gearbox taken substantially along line 9—9 of FIG. 8.

As illustrated in detail in FIGS. 8 and 9, the gearbox 84 includes a generally hemispherical, hollow body 96 provided with an aperture 98 on its left side, and an open right side that is closed by a plate 100 having an aperture 102 axially aligned with the aperture 98. The inner shaft 74 of the rotor 62 extends through and beyond the apertures 98,102 and at that location is matingly received by a cylindrical member 104 having a central portion 106 and a pair of opposite end portions 108 and 110 of reduced diameter. The end portions 108 and 110 project into the apertures 98 and 102 respectively and are journalled by respective bearings 112 and 114. As a result of such bearing support and the mating relationship between the internal bore of the member 104 and the periphery of the shaft 74, the member 104 and shaft 74 rotate together. However, the shaft 74 may be slid axially relative to the member 104 which has its larger diameter central portion 106 captured between the oppositely disposed bearings 112,114. As shown, outer shaft segments 78 and 80 abut the outboard ends of the end portions 108 and 110 respectively of member 104.

The member 104 has a bevel gear 116 rigidly affixed thereto for rotation therewith in the body 96, and the bevel gear 116 in turn meshes with a pinion gear 118 likewise housed within the body 96 but rotatable about an axis normal to the axis of rotation of the bevel gear 116. The pinion gear 118 is rigidly affixed to one end of an input shaft 120 which projects upwardly and forwardly from the rotor 62 through an aperture 122 in the front wall portion 36b and a second aperture 124 (FIG. 7) in the front wall portion 36c. The input shaft 120 at its forwardmost end is operably coupled with the telescoping, U-joint drive assembly 26.

The gearbox 84 has a tubular neck 126 integral with the body 96 and housing the input shaft 120. Like the shaft 120, the neck 126 projects upwardly and forwardly from the body 96 through and beyond the aperture 122 in front wall portion 36b. A resilient O-ring 128 fitted within the aperture 122 surrounds the neck 126 at that location and is clamped in place by a pair of annular plates 130 and 132 situated on opposite sides of the wall portion 36b and joined by suitable fasteners 134. This arrangement thereby provides a means for retaining the gearbox 84 against rotation with the shaft 74, while the resilient O-ring 122 thereof helps absorb and permit a certain amount of limited jostling movement of the gearbox 84 as the rotor 62 rotates and works in the soil. A friction-type slip clutch 136 may be provided in association with the telescoping universal drive assembly 26.

Figure 11:
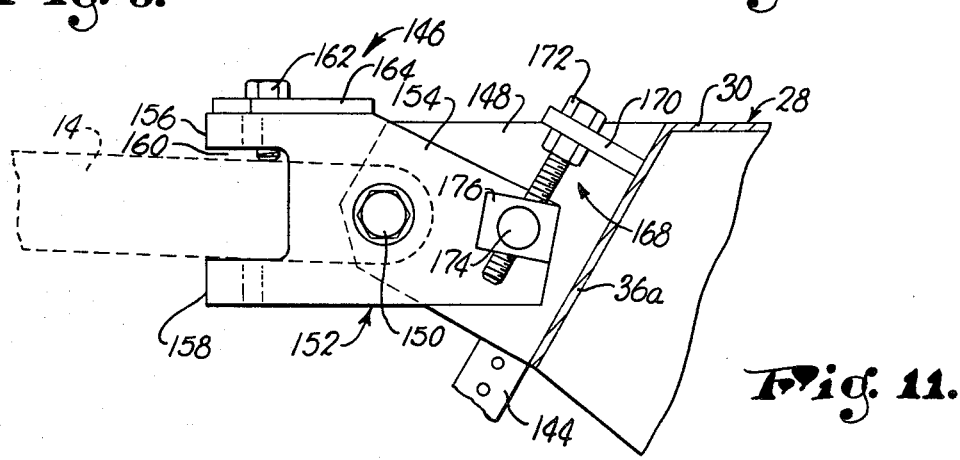
FIG. 11 is an enlarged, fragmentary transverse cross-sectional view through the tiller taken substantially along line 11—11 of FIG. 10 and illustrating details of construction of the mounts for the tiller.

If desired, the tiller 10 may be provided with and include a pair of gage wheels 138 and 140 on opposite ends of the main section 44 of the housing 28 adjacent the front wall portion 36 thereof. Each of the gage wheel assemblies 138,140 includes a groundengaging wheel 142 and a mounting yoke 144 which may be selectively, adjustably attached to the housing 28 at any one of a number of vertically disposed positions so as to limit the depth of penetration of the tilling blades 92. As detailed in FIGS. 11 and 12, the housing 28 is provided with a pair of essentially identical mounts 146 on opposite, equally spaced sides of the input shaft 120 for rigidly connecting the tiller 10 with the lifting links 14 of the tractor 12. In this regard, each of the mounts 146 includes a rigid lug 148 projecting generally upwardly and forwardly from the front wall portion 36a. Lug 148 is pivotally attached via a pivot bolt 150 to the rear end of the corresponding lift link 14. A bracket 152 operably associated with the lug 148 and the link 14 includes an upright plate 154 having a pair of outturned legs 156 and 158 that are separated by a central notch 160. The notch 160 receives and clears the corresponding link 14, while an adjusting set screw 162 rigidly affixed to the upper leg 156 via a horizontally disposed, top web 164 is turned down into abutting engagement with the top edge of the link 14 while the bottom edge thereof rides upon the lower leg 158. As illustrated in FIG. 12 only, the set screw 162 passes through a diagonally extending slot 166 in the web 164 for lateral adjustment purposes.

The bracket 152 is pivotally secured to the lugs 148 via the pivot bolt 150 passing through the plate 154. However, swinging of the bracket 152 relative to the lugs 148 is prevented by an adjuster 168 operably interconnecting the rear end of the bracket 152 with the front wall portion 36a of the housing 28. In this regard, the adjuter 168 for each of the brackets 152 includes a rigid ear 170 projecting forwardly from the front wall 36a and having an adjusting bolt 172 carried thereby for rotation relative thereto without axial displacement. The bolt 172 is threadably received at its lower end within a transverse, rotatable cylinder 174 rotatably carried by a mounting component 176 of the bracket 152. Thus, although the bracket 152 and adjuster 168 of the mount 146 normally provide a rigid, immobile connection between the tiller and the links 14, the angle of the tiller relative to the links 14 may be adjusted by appropriate manipulation of the adjusters 168.

OPERATION

As is clear from the foregoing description, the tiller 10 is rigidly connected to the rear lifting links 14 of the tractor 12 via the mounts 146 so that the tiller 10 can be raised and lowered between groundworking and transport positions when the links 14 are likewise raised and lowered as illustrated in FIG. 1. The universal joint, telescoping drive assembly 26 between the power take-off shaft 24 of the tractor and the input shaft 120 of the tiller 10 enables the rotor 62 of the tiller 10 to remain in operation even as the links 14 raise the tiller 10 out of the ground at each end of a tilling pass by the tractor 12. The tiller 10 remains up and out of the ground as the tractor may be turned around and returned for a second pass in the opposite direction. As a result of the upwardly and forwardly inclined attitude of the input shaft 120, the angle between the latter and the telescoping U-joint drive assembly 26, as well as that between the assembly 26 and the output shaft 24, never becomes severe enough throughout the full range of raising and lowering of the tiller 10 to produce untoward vibration and wobbling in such drive line.

Assuming that the tiller 10 is to be utilized in an inline relationship directly behind the tractor 12, the tiller 10 will be arranged with the sections of its housing 28 as illustrated in FIG. 4 (and also FIG. 2). If, however, it is desired for the tiller 10 to be arranged for laterally rightward offset operation as illustrated in FIGS. 3 and 5, such may be accommodated in a relatively straight forward, expeditious manner. First, the left section 42 of housing 28 is detached and removed from the central section 44 by removing the associated fasteners 60. Endwall plate portions 32 and 34 of sections 42,46 should also be removed. Thereupon, removal of the retaining pins 86,88 from opposite ends of the rotor 62 permits the internal shaft 74 to then be shifted axially rightward to the position illustrated in FIG. 3 wherein the left end of the inner shaft 74 is just slightly outboard of the left bearing 64. The outer shaft segment 76 with its associated blade unit 90 will have been removed by the time the shaft 74 is fully rightwardly shifted. Replacement of the left retaining pin 86 into its original position within the shaft 74 prevents further rightward movement of the shaft 74 as the pin 86 abuts the inner component 68 associated with left bearings 64.

The left outer shaft segment 76 is then slipped onto the right end of the inner shaft 74 outboard of the right outer shaft segment 82. Replacement of the locking pin 88 into its original position thereupon retains the two outer shaft segments 82 and 76 against rightward removal from the shaft 74. The left housing section 42 may then be attached onto the outboard side of the right section 46 using the appropriate fasteners 60, whereupon the right endwall plate portion 34 may be replaced, but this time upon the repositioned left housing section 42.

As shown in FIG. 13, the rear wall portion 38b of the housing 28 is swingably carried by a rod 178 stretching between the two outboard endwall portions 32 and 34 when the latter are positioned for inline operation. As with the above-described components, the rear wall portion 38b may likewise be shifted for rightward offsetting operation by temporarily detaching the spring-biasing assembly 40 from the central set of mounting holes 180 as shown in FIG. 13, shifting the wall portion 38b rightwardly until ultimately supported at its opposite end extremes by an outboardmost endwall portion 32 or 34 at the right end (depending upon which is utilized as a right endwall for the housing) and an inboard endwall portion 48, and then reattaching the assembly 48 to the left set of mounting holes 182. A right set of mounting holes 184 is also provided on the rear wall portion 38b in the event that leftward offset operation is desired.

As a result of the special construction of the gearbox 84 and, particularly, the internal cylindrical member 104, the necessary and desirable amount of axial shifting of shaft 74 may be readily carried out relative to the gearbox 84 without in any way sacrificing the transmission of driving power from the input shaft 120 to the primary driving shaft 74 of the rotor 62. Thus, by locating the gearbox within the confines of the housing 10 without sacrificing performance or flexibility insofar as inline or offset operation is concerned, the overall profile and configuration of the tiller 10 is low and compact with a streamlined appearance to afford an overall uncluttered, clean design. Utilizing the special rigid mounts 146 to secure the tiller 10 to the lifting links 14 permits the complete avoidance of cumbersome, heavy and unsightly A-frame mounting structure and the like typically utilized on prior tillers to attach the same to the three-point linkages of the tractors, including an upper stabilizing link commonly associated with such three-point linkage. Furthermore, the direct, inline driving connection between the gearbox 84 and the power takeoff shaft 24 of the tractor provides significant advantages in terms of reliability, maintenance, costs and performance.

Of course, if it is desired that the tiller 10 be adapted for leftwardly offset operation, the sequence of events described above with respect to rightward offsetting operation are modified only to take into account reversal in direction of shifting displacement for the rotor 62 and the end housing sections 42 and 46. It should also be noted that additional end housing sections (not shown), as well as additional rotor sections (not shown) can be added onto those illustrated herein if it is desired to increase the overall operating length of the presently shown rotor 62.

We claim:

1. A rotary tiller mountable on the two, parallel lower lift links of a three-point hitch of a tractive vehicle for direct drive by the vehicle power takeoff shaft having a rear end disposed between, above, and forwardly of the rear ends of said links, said tiller comprising:
   a support;
   a ground-working rotor carried by said support for rotation about a horizontal axis extending transversely of the normal path of travel of the tiller;
   a gearbox unit on said rotor having output means drivingly coupled therewith and rotatable about said axis of rotation thereof,
   said gearbox unit further including an input shaft coupled with said output means, disposed normal to said axis, and projecting upwardly and forwardly from said axis; and
   a pair of mounts on said support above and forwardly of the rotor and on opposite sides of the axis of rotation of said input shaft for rigidly attaching the tiller to said links,
   said mounts including link-engaging pivotal coupling means and structure for holding said support against pivoting movement relative to said links about said coupling means when the links are raised and lowered whereby to permit raising and lowering of the tiller between ground-working and transport positions without changing the angle between said links and the axis of rotation of said input shaft,
   said input shaft having coupling means at its upper forward end adapted for connection to the vehicle power takeoff shaft through an intermediate drive shaft having an axis of rotation which remains sufficiently aligned with the axis of rotation of the input shaft during raising and lowering of the tiller between said ground-working and transport positions to transfer driving power to said input shaft and thereby permit the rotor to remain in operation during such raising and lowering of the tiller.

2. A tiller as claimed in claim 1, wherein said gearbox unit includes an elongated, tubular portion receiving said input shaft and projecting upwardly and forwardly therewith from said rotor, said support being provided with resilient retainer means holding said tubular portion against rotation with the rotor while permitting the gearbox unit to move in a limited manner with the rotor during transverse loading of the latter from ground engagement.

3. A tiller as claimed in claim 2, wherein said support is further provided with an open bottom housing receiving said rotor and the gearbox unit, said housing including a normally front wall having an aperture therein for clearing said tubular portion as the latter passes therethrough, said resilient means being disposed in said aperture.

4. A tiller as claimed in claim 1, wherein said structure includes means for selectively adjusting the angle between said lift links and the axis of rotation of the said input shaft.

5. A tiller as claimed in claim 8, wherein said structure includes a clamp swingably mounted on said pivotal coupling means and rigidly attachable to the link, and a selectively extendable, rigid connector between said clamp and the support.

6. In a rotary tiller as claimed in claim 1, wherein said rotor includes means for adjustably displacing the same axially in either of two opposite directions to render the rotor offset laterally in a selected direction with respect to said input shaft.

7. In a rotary tiller as claimed in claim 6, wherein said rotor includes a first shaft drivingly coupled with said output means but axially shiftable relative thereto, at least a pair of second shafts on opposite sides of said gerbox unit and in removable, telescoping, driving relationship with said first shaft, and means for releasably retaining each of said second shafts against removal from one end of the first shaft on one side of the gearbox unit and placement upon the opposite end of the first shaft on the other side to the gearbox unit upon axial shifting of the first shaft toward said other side of the gearbox unit.

8. In a rotary tiller as claimed in claim 7, wherein said support is provided with a housing that includes a central section and a pair of opposite end sections detachably secured to said central section, said end sections each being adapted for removal from said central section and attachment to the other end section outboard thereof whereby to laterally offset said housing with respect to said input shaft in a selected direction.

9. In a rotary tiller as claimed in claim 7, wherein said output means includes a gear provided with a tubular member rigidly connected thereto and having an internal bore of rectangular cross-sectional configuration, said first shaft being matingly received within said member, said second shafts having a tubular, mating cross-sectional configuration with respect to said first shaft and encompassing the latter.

* * * * *